United States Patent
Hong et al.

(10) Patent No.: US 6,291,022 B1
(45) Date of Patent: Sep. 18, 2001

(54) PROCESS FOR MANUFACTURING A GLASS ARTICLE HAVING A DURABLY WATER-REPELLENT SURFACE

(75) Inventors: Byung Sun Hong, Yichun-si; Joo Hun Han, Seoul, both of (KR)

(73) Assignee: Samsung Corning Co., Ltd., Kyungki-Do (KR)

( * ) Notice: Subject to any disclaimer, the term of this patent is extended or adjusted under 35 U.S.C. 154(b) by 0 days.

(21) Appl. No.: 09/484,210

(22) Filed: Jan. 18, 2000

Related U.S. Application Data

(62) Division of application No. 09/009,940, filed on Jan. 21, 1998.

(30) Foreign Application Priority Data

Jan. 24, 1997 (KR) .................................................. 97-2042
Jun. 26, 1997 (KR) ................................................ 97-27532

(51) Int. Cl.⁷ ...................................................... B05D 3/02
(52) U.S. Cl. ................................. 427/389.7; 427/389.8; 427/397.7; 427/397.8; 427/407.2
(58) Field of Search ............................. 427/389.7, 389.8, 427/407.2, 397.7, 397.8

(56) References Cited

U.S. PATENT DOCUMENTS

| | | |
|---|---|---|
| 3,579,540 | 5/1971 | Ohlhausen . |
| 4,816,333 | 3/1989 | Lange et al. . |
| 5,523,161 | 6/1996 | Goodwin . |
| 5,651,921 * | 7/1997 | Kaijou .................................. 252/309 |
| 5,674,625 * | 10/1997 | Takahashi et al. ................... 428/428 |
| 5,707,740 | 1/1998 | Goodwin . |
| 5,814,397 | 9/1998 | Cagliostro et al. . |
| 5,856,016 | 1/1999 | Takahashi et al. . |
| 5,895,722 | 4/1999 | Kobayashi et al. . |

FOREIGN PATENT DOCUMENTS

| | | | |
|---|---|---|---|
| 0 461 782 A2 | 12/1991 | (EP) | ............................ H01L/21/316 |
| 0 461 782 A3 | 12/1991 | (EP) | ............................ H01L/21/316 |
| 0 476 510 A1 | 3/1992 | (EP) | ................................ C03C/17/42 |
| 0 545 201 A2 | 6/1993 | (EP) | ................................ C03C/17/27 |
| 0 545 201 A3 | 6/1993 | (EP) | ................................ C03C/17/27 |
| 0 597 490 A1 | 5/1994 | (EP) | ................................ C03C/17/25 |
| 0 545 258 A1 | 6/1996 | (EP) | .................................. C03C/1/00 |
| 0 775 669 A2 | 5/1997 | (EP) | ................................ C01B/13/32 |
| 0 775 669 A3 | 8/1997 | (EP) | ................................ C01B/13/32 |
| 04-124047 | 4/1992 | (JP) . | |
| 04-325446 | 11/1992 | (JP) . | |
| 05-24885 | 2/1993 | (JP) . | |
| 05-147976 | 6/1993 | (JP) . | |
| 06-116430 | 4/1994 | (JP) . | |

* cited by examiner

Primary Examiner—Brian K. Talbot
(74) Attorney, Agent, or Firm—Pillsbury Winthrop LLP

(57) ABSTRACT

A water-repellent glass having a durable and abrasion-resistant silica layer is prepared by a process containing the following steps:

(a) preparing a silica solution by subjecting a metal alkoxide-based silane compound to a two step aging process wherein the two step aging process is proceeded either by conducting a first aging step under a basic condition and a second aging step under an acidic condition or vice versa, (b) applying the resulting silica composition onto the surface of a glass substrate, (c) subjecting the glass substrate coated with the silica composition to a thermal treatment, and (d) coating the resulting coarse silica layer with a water-repellent layer.

7 Claims, 2 Drawing Sheets

PROCESS FOR MANUFACTURING A GLASS ARTICLE HAVING A DURABLY WATER-REPELLENT SURFACE

This is a division of application Ser. No. 09/009,940, filed Jan. 21, 1998.

BACKGROUND OF THE INVENTION

1. Field of the Invention

This invention relates to a glass article having a water-repellent surface having excellent durability. In particular, a coarse surface silica layer having micro-crystal silica particles is formed on the glass substrate. On top of a surface, fluoroalkylsilane (FAS) is applied, forming such water-repellent layer. More particularly, this invention relates to such water-repellent glass having a superior durability and water repellent property, and to a process for manufacturing the same, in which long-term use does not induce deformation in appearance and deterioration in water-repellent property.

2. Background of the Invention

In the case of various types of glasses exposed to an external environment, such as safety glass windows for automobiles, building glass windows, and mirrors the surface of such glass articles frequently becomes contaminated with rain or some other moisture, resulting in a poor visual field. In order to solve that problem, a water-repellent property conventionally has been added to the surfaces of such glass articles.

In general, to provide a water-repellent property to the surface of a glass article, the surface energy at the glass surface should be lowered. To this end, a substance having low surface energy (hereinafter referred to as "water-repellent agent") should be placed on the glass surface. In line with this, a common type of soda lime glass plate shows a contact angle of about 20° to water, but a glass sample with excellent water-repellent treatment shows a contact angle of more than 100°.

As prior art, "RAIN-X" (Unelko Corp. USA, U.S. Pat. No. 3,579,540), the currently commercialized process for coating a silicon-based water repellent agent onto the surface of a glass substrate is the most well-known process via-a-vis adding a water-repellent property to the surface of a glass substrate via coating with a water-repellent agent. In general, hydrocarbon-based silicon-based, chlorine, a fluorine compounds are being used as water-repellent agents, for such uses. Among them, hydrocarbon- and silicon-based compounds have a critical surface tension of about 30 dyn/cm, and fluorated alkyl compounds (hereinafter referred to as "Rf compounds") containing CF3 and CF2 groups within the respective molecules have a critical surface tension of less than 20 dyn/cm, thus effectively repelling water, polar solvent and even oil.

Hitherto, the fluoroalkylsilane-based water-repellent agents have been reported as having the best water-repellent property among the conventional water-repellent agents since they have an ample amount of CF3 or CF2, a substance providing the lowest surface energy. Further, the corresponding linear structure is quite advantageous in increasing the density of water-repellent group.

A water-repellent agent for, providing the water-repellent property to glass, has a molecular site with tendency to induce a strong siloxane bond (Si—O—Si) by reacting with a silanol (OH) group at the glass surface and an Rf group with a fluorocarbon group providing a hydrophobic property at the other side contacting air. With such structural characteristics, various methods of providing a water-repellent property on a glass surface using Rf compounds have been developed as the most practical approach. However, in the case where these fluorine compounds are applied to soda lime glass, the dissolution of alkali within the glass is responsible for degrading the water-repellent property, with the passage of time.

Therefore, it is necessary that a fine and firm silica film be coated on the surface of the glass substrate that is to be made water repellent prior to applying the water-repellent film, in conjunction with inhibiting the dissolution of alkali substances within the glass. In particular, in the case of the automobile glass which is vulnerable to the external environment due to ceaseless surface friction and contamination, its water-repellent capability from the direct treatment by water-repellent agent is insufficient. Thus, additional factors for durability should also be considered. Durability as applied here means resistance from abrasion, scratching, rain, wind, chemical substances, sun rays, ultraviolet and temperature, etc. Namely, such durability allows the continuation of the water-repellent property for a long period of time, for the enjoyment of the functional benefits of the water-repellent glass.

In the past, many inventors have extended their intensive studies to improve the durability of water-repellent glass in various aspects. Among the conventional methods, for the purpose of providing durability to the water-repellent film, the technology of forming a sub-layer film, comprising highly adhesive and durable materials, at the surface of the desired substrate prior to forming a water-repellent film has been in common usage in the field of coating technology, using the sol-gel method. Namely, it is a method of double film treatment in which a silica layer using tetraethoxysilane (TEOS) is first formed at the surface of the glass substrate, and then, a water-repellent film comprising an Rf compound is formed thereon. In addition to TEOS, other metal oxides such as $Al_2O_3$, $TiO_2$, $ZrO_2$, $ZnO_2$ or ITO may be selected use as the silane compound.

However, if the water-repellent agent is directly applied to the plain glass and the silica surface, the adhesion area to the slippery surface is relatively small. Thus, removability of the water-repellent agent from the surface cannot sustain the durability and water-repellent property.

To solve this problem, the Japanese Unexamined Patent Applications Hei No. 4-325446 and Hei No. 5-24885 disclose methods of enhancing the durability in such a manner to form fine pores within a silica layer, by mixing polyethylene glycol and triethylene glycol monoethylene ether when forming the silica layer. Further, the Japanese Unexamined Patent Applications Hei No. 4-124047 and Hei No. 6-116430 disclose methods of forming at least one transparent metal oxide layer at the glass surface and a modifying the surface thereafter via wet etching or plasma discharge etching, and then finally forming the water-repellent layer on the of the surface as so modified.

However, the fine pores within the silica layer formed by the methods of the Japanese Unexamined Patent Applications Hei No. 4-325446 and Hei No. 5-24885 are not stable during thermal treatment process at temperatures of more than 400° C., thereby unduly restricting the thermal treatment process. Furthermore, the methods disclosed by the Japanese Unexamined Patent Applications Hei No. 4-124047 and Hei No. 6-116430 have the disadvantage of requiring an additional etching process after the formation of the silica layer.

Meanwhile, the Japanese Unexamined Patent Application Hei No. 5-147976 discloses a metal oxide manufacturing method which provides an ample amount of fine coarse surface via the sol-gel method using a sol-gel which is prepared from and obtained by mixing two sols having different molecular weights, and using metalalkoxide or methylacetylacetonate.

Nevertheless, such methods have disadvantages and require improvement in that a) the durability effect which they provide is not satisfactory, and b) the processes are complicated so that there a small economic benefits.

SUMMARY OF THE INVENTION

The objective of the invention disclosed herein is to provide the surface of a glass substrate with a water-repellent characteristic, with superior durability, including abrasion resistance, which will solve the above-mentioned problems. In the process of forming a silica layer comprising metal oxides at the surface of a conventional glass substrate, the fine granular silica crystal particles are evenly distributed within such silica layer. Then, by thermal treatment at low temperature, a water-repellent layer is formed on the silica layer. Henceforth, in a more economical and efficient manner, such water-repellent surface treatment which is applied to a glass according to the invention which is disclosed herein effectively prevents deterioration of functional aspects and deformation of the external appearance of the glass substrate.

DETAILED DESCRIPTION OF PREFERRED EMBODIMENTS

This invention is explained in more detail hereunder by way of example, with reference to the accompanying drawings.

Figure 1:
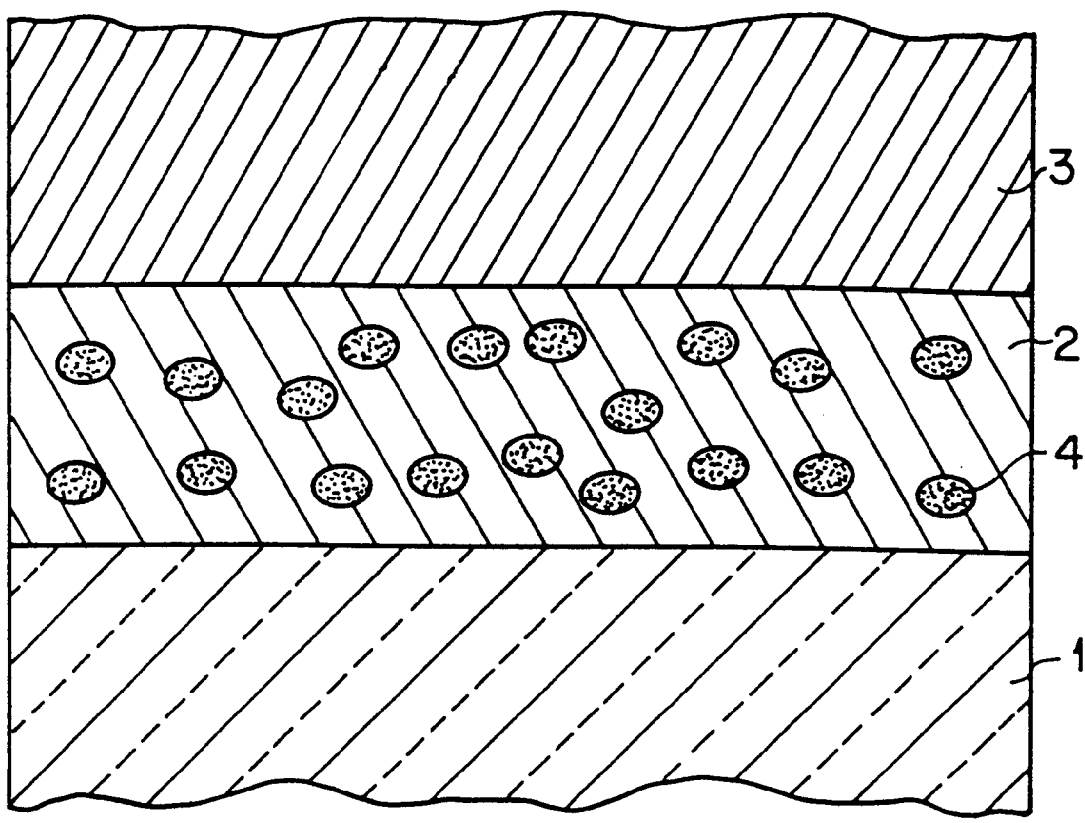
FIG. 1 is the diagram showing in cross-section the structure of the durable water-repellent glass article according to this invention.

The durably water-repellent glass substrate of this invention is characterized in that a durable silica layer 2, comprising a silica compound, is formed at the surface of the glass substrate 1. In particular, an ample amount of fine silica crystals particles 4 are distributed within the silica layer 2. As illustrated in the cross-sectional diagram of FIG. 1, water-repellent glass, has a silica layer 2 is formed at the surface of the glass substrate 1 for the purposes of providing durability to the same. On the silica layer 2, fluoroalkylsilane (FAS) is applied, forming the water-repellent layer 3. In order to enhance durability including abrasion resistance of the silica layer 2 and the water-repellent layer 3, the fine granular silica crystal particles 4 are distributed within the silica layer 2.

According to this invention, the formation of the silica crystal particles 4 is due to the fact that a aging process is provided as a two-step process during the making of the silica sol comprising the silica layer 2. Consequently, an ample amount of fine silica crystal particles 4 are generated within the the layer 2, so that the mechanical properties including abrasion resistance of the glass are enhanced. The silica crystal particles, so formed, are of a granular type, and some which are hollow may be formed.

The silica layer 2 is formed from a silica solution, which is subjected to the two-step aging process, and as are of a thermal treatment of the substrate, surface coarseness is provided on the silica layer 2.

A process for preparing the water-repellent glass substrate of this invention is explained in more detail hereunder.

The process for preparing the water-repellent glass substrate having a silica layer at the surface of the glass substrate is as follows: As for the silica solution, a metal alkoxide-based silane compound is subjected to a two-step aging process for the manufacture of a silica solution in which two polymers are cross-linked. Then, the surface of the glass substrate is coated with this solution, after which the substrate undergoes thermal treatment for the formation of the silica layer having surface coarseness. Thereafter, the surface of the silica layer having surface coarseness is coated with the water-repellent agent, for the formation of the water-repellent layer.

According to this invention, in order that the silica sol solution for preparing the silica layer will have a cross linked structure where granular colloid silica solution and linear polysiloxane solution are mixed, the silica sol solution is subjected to a first step of the aging process in the presence of a basic catalyst, and then to a second step of the aging process in the presence of acidic catalyst. Such procedure is designed to provide surface coarseness to the silica layer and to distribute fine silica crystal particles in the film after a thermal treatment. The silica solution is formed by adding a solvent (e.g., ethanol) to tetraethoxysilane (TEOS). Further, in order to facilitate hydrolysis, distilled water ($H_2O$) is used Aqueous ammonia solution ($NH_4OH$) may be selected as a basic catalyst used for the first step of the aging process, and hydrochloric acid (HCl) may be selected as an acidic catalyst used for the second step of the aging process.

According to this invention, the order of the two step aging process may be reversed in such a manner that the acidic catalyst is used as the first step aging and the basic catalyst is used in the second aging step.

Further, according to this invention, a thermal curing process should be performed for the preparation of the silica layer using the second step-aged silica solution. It is preferred that a small amount of inorganic salt be added to the silica solution for the purposes of lowering the thermal curing temperature. It is advantageous to use the inorganic salt in aqueous solution in mixing. Also, it is preferred to use such inorganic salt in the amount of 0.1~3.0 wt % to water. The inorganic salts used for this reaction include NaCl, $NH_4Cl$, $KNO_3$, $NaNO_3$, or $CH_3COONa$, but it is particularly preferred to use $KNO_3$.

According to this invention, the first step of the aging process of the silica solution is performed in such a manner that tetraethoxysilane is added to the solvent, for mixing and stirring at room temperature. With the addition of basic catalyst, the reacting solution is stirred until the pH is more than 9.0. Then, the first step of the aging is carried out at room temperature ~80° C. for 12~24 hours. If the first-step aging time is longer than 24 hours, the poor water-repellent durability results, due to the fact that excessive development of granular particles (granular silica crystal particles) prevents the formation of the required structural density. Meanwhile, if the amount of basic catalyst used for the first aging is more than 1 wt % in proportion to the silica solution, opaqueness in the coating may occur. Thus, it is preferred to use less than 1 wt % of basic catalyst. By hydrolysis and polycondensation associated with the first aging in the presence of basic catalyst, colloidal silica which is granular silica polymer is formed due to the nucleophilic condition of Si. In the process of such reaction, the second aging is performed, with the addition of acidic catalyst and water, for more than 2 hours, until the pH becomes approximately 1.2~2.7. Then, unhydrolyed $Si(OR)_4$ is subjected to hydrolysis and polymerization, thus effectuating the shape of polysiloxane, which is a linear polymer, by electrophilic attack. Consequently, the sol formed via the second step of the aging process will have a crosslinking form where both granular and linear polymers coexist. Based on such morphological characteristics, the second step-aged silica solution is coated at the surface of the glass and thermally treated. As a result coarseness at the glass surface may be naturally formed without any separate process.

According to this invention, coating with the silica solution may be made by dipping or spraying. In addition to these methods, some well-known coating methods may also be applied. If the dipping method is used a substrate made of soda lime glass of 2.5×7 cm, in proper size, is immersed in silica sol solution, formed by the above described the two-step aging process, so as to naturally form a coating film, with slow raising of the glass substrate being coated, from the silica solution.

The preferred raising speed is in the range of 10~30 cm per minute. If the speed is fast, an increased thickness of the coating film results, which is responsible for non-homogeneousness of the film and poor glass transparency. However, if such raising speed is too slow, the extremely thin film thereby formed cannot have sufficient durability.

Alternatively, if the spray-coating method is used, the silica sol is sprayed onto a soda lime glass substrate of 30×30 cm in size. Special caution in spraying should be exercised. The thickness of the coating film increases if too much of a volume is sprayed and the distance between nozzle and specimen is too close. Under the spray method for coating the total specimen area, the nozzle is first moved from the left to right, and then the nozzle is lowered by approximately 3 cm, after which the nozzle is moved from the right to left, and so on. However, in the process of moving the nozzle, some areas of the specimen are sprayed-onto a second time. The poor appearance in such areas becomes more severe at low temperature or humidity, but under the condition of 50% humidity or more, especially 80% humidity or more, appearance defects at the borders where spray passes overlap will not occur.

When the silica solution is applied onto the glass surface using either procedure described above, it is preferred that the thickness of the coating film be in the range of 600~1500 Å, more preferably in the range of 600~1000 Å. If the coating film is extremely thin, there will be insufficient durability improvement. Further if the coating film is extremely thick, the film will be non-homogeneous and poor in quality.

After, the glass substrate surface has been coated with the silica sol solution the thus-coated article undergoes thermal treatment at a temperature of 180–550° C., preferably at a temperature of 180~350° C. for more than 30 minutes. If the thermal treatment temperature is higher than 550° C., this does not affect the water-repellent property regarding the change in the first-step aging time in the presence of basic catalyst. However, in the case of the second-step aging time in the presence of acidic catalyst, there will be a significant reduction in the water-repellent power after 3 days from manufacture. Also, if the thermal treatment temperature is lower than 180° C., the density and hardness of the film will deteriorate. Meanwhile, according to this invention, when the silica sol, which has been seen subjected to a one-day first step of the aging process with the addition of $NH_4OH$ as basic catalyst, and to a 3-day second step of the aging process with the addition of HCl as acidic catalyst and the resultingly coated article undergoes a thermal treatment at approximately 200~300° C., the water-repellent durability of the resulting coating proves to be superior to that of an otherwise similarly manufactured coated glass substrate which has been produced at a higher temperature.

Through the above described thermal treatment, the silica forms the siloxane cross-linking layer of strong Si—O—Si bonds to the glass.

Figure 2:
FIG. 2 is the photograph of transmission electron microscopy ($1\times10^5$ times enlargement) showing a cross section of the silica layer formed by coating the glass surface with silica solution during the process of preparing the durable water-repellent glass article of this invention.

FIG. 2 is a photograph showing by transmission election microscopy, a cross-section of the silica layer, as formed on the surface of the glass aforementioned. Referring to FIG. 2, it is ascertained that the film thickness of the silica layer is in the range of 600~1500 Å depending on the solution and coating condition, and fine granular silica crystal particles are evenly distributed within the silica layer. It is ascertained that the particles of FIG. 2 are silica crystal particles when analyzed by X-ray diffraction pattern. The diameters of such particles are in the range of 100~300 Å, and they are of a granular type, with a hollow or filled inner part. In general, it appears that they are in the silica matrix phase, amorphous and in a chemically coherent state.

According to this invention, if such silica crystal particles, which are coherently bordered with the silica matrix, are diffused as shown in FIG. 2, the induced effect, such as combining material thereto, may enhance the mechanical properties, including durability of the film, and including the resistance to abrasion, in particular. Since the production of such particles is derived from chemical and thermodynamic reaction, this may be achieved via the manufacture of the silica sol solution based on the two-step aging process of this invention.

A commonly available water-repellent solution may be used for coating the silica layer formed on the surface of the glass substrate according to this invention. For example, fluoromethoxysilane ($CF_3(CF_2)_7CH_2CH_2Si(OCH_3)_3$), isopropyl alcohol, hydrochloric acid (HCl) and distilled water are blended in a certain chemical ration and the blend is subjected to hydrolysis for a certain time prior to use. HCl or a similar acid is used for the catalyst to facilitate the hydrolysis, and isopropyl alcohol is added as a solvent. The reason why the water-repellent agent is under hydrolysis and polycondensation is to maximize the siloxane reaction (Si—O—Si) by facilitating the reaction between the Rf group and silanol group (OH) at the surface of the silica layer.

According to this invention, some Rf compounds which can be used in constituting the water-repellent agent solution include $CF_3(CH_2)_7CH_2CH_2SiCH_3(Cl)_2$, $CF_3CH_2CH_2SiCl_3$ and $CF_3CH_2CH_2Si(OC_2H_5)_3$), in addition to fluoromethylsilane ($CF_3(CF_2)_7CH_2CH_2Si(OCH_3)_3$). Further, nitric acid and acetic acid can be used as a catalyst, in addition to hydrochloric acid being able to be used.

The water-repellent coating, based on the water-repellent agent solution, may be applied under the same conditions as the coating for formation of the silica layer. Then, if the glass substrate coated with water-repellent agent is heated and dried at 120~170° C. for more than 30 minutes, the water-repellent layer will thus be formed.

It has been reported that the contact angle of a water drop, a criterion of the water-repellent property on the durable water-repellent glass having such a water-repellent layer, is a function of the coarseness characteristics of the Rf group the chemical composition of the water-repellent agent, and its surface shape (New Glass Vol. 12 No. 2, 1996). Namely, it means that the contact angle may increase depending on the coarseness surface.

In addition to that, the further coarseness of the silica layer increases the surface area, and a more durable water-repellent layer is formed by increasing the chemical reaction sites with the water-repellent agent, such as by providing a silanol group at the surface. Thus, the durability may be improved even under such severe condition of wear and tear.

This invention is further explained based on the following examples in more detail.

EXAMPLE 1

Preparation of Water-Repellent Glass Based on Two-Step Aging Process of Silica Solution and Dip-Coating Method A. Synthesis of silica layer-forming solution A mixture 52 g of tetraethoxysilane (TEOS) and 448 g of ethanol was stirred for 30 minutes, and with the addition of 2.5 g of $NH_4OH$, the reacting solution was further stirred for 1 hour. Then, 16 g of 1 wt % $KNO_3$ aqueous solution was added to the reacting solution, stirred for 2 hours, tightly closed and subjected in aging at a thermostatic bath at 30° C. for 24 hours.

5 g of the hydrochloric acid was added to the solution, stirred for 2 hours. Then, the synthesis of silica layer-forming solution was completed.

B. Preparation of silica layer

A sheet soda lime glass was cut provide a piece measuring 2.5×7 cm (thickness 0.1 cm) and that piece was subjected to a first washing, using a surfactant. After dipping the piece of glass in distilled water, the piece of glass was subjected to a second washing for 15 minutes, using an ultrasonic cleaner. Then, the piece of glass was subjected to a third washing, using a acetone, and dried with a dryer at 120° C. The specimen was then immersed in a silica layer-forming silica sol solution for 30 seconds, using a motor driven dip coater and increasing the speed to a rate of 11 cm/min. The sample was under thermal treatment at 300° C. with the temperature increasing at a of 7° C./min.

C. Preparation of water-repellent layer

A water-repellent coating was provided on the glass substrate having the silica layer. For that purpose, fluoromethylsilane ($CF_3(CF_2)_7CH_2CH_2Si(OCH_3)_3$), ethanol, hydrochloric acid and distilled water as starting materials for making a water-repellent solution were mixed in a respective ration of 3 g, 150 g, 1 g and 0.3 g. Then, the mixture was stirred at room temperature for 5 hours and subjected to aging for 1 day. The sample having the silica layer was coated using the water repellent agent under the same conditions as are above, using the dip coater. The sample coated with the water-repellent agent was heated and dried at 150° C. for 1 hour for the formation of the water-repellent layer.

D. Assessment and analysis of various physical properties

The contact angle on the glass sample formed with the above described silica layer and water-repellent layer was measured, together with abrasion/alkali resistance, anti-acidity and heat-resisting property. The contact angle was measured by the method of sessile drop using the contact angle instrument (model CA-X, Kyowa Interface Science Co. Ltd.). After measuring the contact angle 5 times at different places, the mean value was calculated.

The abrasion-resistance was measured in such a manner that an automotive wiper blade was cut in 1 cm size to a length. With a load of 300 g/cm given to the wiper blade piece, the glass sample was subjected to double-trip tests 5000 times at a double-trip rate of about 2 seconds and then, the contact angle was measured for assessment.

An alkali-resistance test was performed in such manner that the specimen was quenched in 1N NaOH solution for 6 hours and taken out for the measurement of the contact angle. An anti-acidity test was performed in such manner that the specimen was dipped in 1N HCl solution for 6 hours and taken out for the measurement of the contact angle.

The heat resistance property was assessed in such a manner that the specimen was dipped in boiling water for 2 hours and taken out for measurement of the contact angle, particularly reduction of the contact angle.

With reference to the abrasion resistance and visual haze, the visual haze (KS L 2007 standard test method) was assessed by Hazemeter (BYK Gardner, Germany) after rotating the sample 100~500 times using the Taber abrasion device (5150 Taber Abraser, USA).

Meanwhile, with reference to the surface coarseness of the coated glass, its Ra (centerline average, centerline mean coarseness) value, a criterion of the surface shape and surface coarseness, was calculated using the Atomic Force Microscopy (AFM)(DI 3000, USA).

Further, transmission electron microscopy was used for observation of the coated cross section.

The above measurements and observed results are shown in the the accompanying Tables 1 and 2.

EXAMPLE 2

Preparation of Water-Repellent Glass Based on Two-Step Aging Process of Silica Solution and Spray-Coating Method The manufacture and assessment of silica sol solution, including subjection the second aging designed for the formation of a silica layer, was made performed as described above in relation to Example 1.

In an effort to make a coating on a glass substrate, using the silica sol solution which has undergone the two step aging process, the glass substrate having 30×30 cm in size was washed. The distance between the spray nozzle and specimen was 15 cm, and the moving speed of nozzle was 40 cm/sec. The coating was made at room temperature under an atmosphere of 85% humidity, and the air pressure and solution pressure for injection were adjusted to be 0.7 bar and 0.5 bar, respectively. The spray coating for the total specimen area was performed in the following manner. After the nozzle was moved at 40 cm/sec from the upper left part of specimen to right, it was moved downward by 3 cm. Thereafter, the nozzle was moved from right to left at the same speed as above, and it was again moved downward by 3 cm, and so forth. Then, the spray-coated glass was subjected to thermal treatment at 300° C. for 30 minutes, at an increasing temperature rate of 7° C./min. The thickness of the silica layer formed by this process is 850 Å.

By the same procedure as described in Example 1, the silica layer-formed sample was coated with the water-repellent agent for the formation of the water-repellent layer.

The assessment of various physical properties relating to the water-repellent glass, so prepared, is shown in the accompanying Tables 1 and 2.

COMPARATIVE EXAMPLES 1 AND 2

Preparation of Water-Repellent Glass Using Polysiloxane-Structure Silica Sol

A mixture of TEOS, ethanol, distilled water and catalytic hydrochloric acid in respective blending ratio of 72.8 g, 601.9 g, 25.2 g and 0.14 g was added to the silica-forming solution and stirred at room temperature for 3 hours. The reacting solution was again subjected to an aging process at room temperature for 4 days to obtain polysiloxane-structure silica sol solution. The water-repellent glass, so prepared by such method, was assessed by the same procedure as in Example 1. Each silica layer-formed specimen was prepared by dip coating method (comparative Example 1) and spray coating method (comparative Example 2). The formation of the water-repellent layer was also made available by the same procedure as Example 1.

An assessment of various physical properties relating to the water-repellent glass, so prepared, is shown in the accompanying Tables 1 and 2.

TABLE 1

Comparison of Initial Contact Angle, Water-repellent Durability and Fundamental Properties

|  | Example | | Comparative Example | |
|---|---|---|---|---|
| Classification | 1 | 2 | 1 | 2 |
| Appearance | Excellent | Excellent | Excellent | Excellent |
| Fine Particles | Presence | Presence | Absence | Absence |
| Surface Coarseness (Ra. Å) | 42 | 110 | 15 | 19 |
| Initial Contact Angle | 122 | 123 | 106 | 105 |
| Anti-abrasiveness (Wiper Blade Method) | 108 | 109 | 98 | 97 |
| Acid Resistance | 118 | 119 | 102 | 102 |
| Alkali Resistance | 109 | 108 | 97 | 96 |
| Heat Resistance | 119 | 118 | 105 | 103 |

As revealed in Table 1, no diffused crystal particles in the silica layer were observed from the comparative Examples 1 and 2.

TABLE 2

Assessment of Contact Angle and Visual Haze after TABER Abrasion Test

Assessment of Contact angle and Haze after Taber Abrasion Test (100~500 times)

|  | 100 Times | | 300 Times | | 500 Times | |
|---|---|---|---|---|---|---|
| Classification | Contact Angle (°) | Haze (⌀H %) | Contact Angle (°) | Haze (⌀H %) | Contact Angle (°) | Haze (⌀H %) |
| Example | | | | | | |
| 1 | 104 | 0.6 | 98 | 0.7 | 90 | 0.9 |
| 2 | 106 | 0.5 | 99 | 0.7 | 92 | 0.9 |
| Comparative Example | | | | | | |
| 1 | 97 | 0.7 | 87 | 0.8 | 78 | 1.1 |
| 2 | 95 | 0.7 | 85 | 0.8 | 75 | 1.8 |

As can be seen from Table 1, various physical properties of the test samples (e.g., initial contact angle and water-repellent durability) show that the water-repellent glass based on the silica layer, so prepared by the two-step aging method from Examples 1 and 2, has proven to be superior to that of comparative Examples 1 and 2, which were prepared so as to have a conventional simple silica layer, in terms of water-repellent durability, including anti-abrasiveness as well as initial contact angle. Further, the fact that both Examples 1 and 2 have a high value of more than 120 as an initial contact angle is due to the coarse surface of the water-repellent glass.

With reference to the above, the photograph of atomic force microscopy (AFM) of FIG. 2 shows the surface coarseness of the sample prepared by Example 1. Its Ra value was about 42 Å. Meanwhile, from the test of anti-abrasiveness and alkali-resistance measured by the wiper blade method described above, it is revealed the values for the water-repellent glass made by the method of two-step aging was higher than that of the simple silica film of the comparative Examples by more than 10°.

Table 2 shows the measurement results of the contact angle and visual haze value after the Taber abrasion test. Both Examples 1 and 2 maintained a water-repellent power of more than 90° by 500 times, while the simple silica film had the contact angle of less than 90° by 300 times, but its contact angle was reduced to less than 80° by 500 times. Further, from the measurement of visual haze, all samples showed excellent water-repellent power having less than 2.0% of ΔH. In particular, less than 1.0% from both Examples 1 and 2 was observed in the change of haze value by 500 times. Further, since the change of haze on Taber abrasion was negligible, the durability of both Examples 1 and 2 was greatly improved.

As aforementioned, according to the invention disclosed herein, various glass substrates, such as safety glass for the windows of an automobile, building glazing, and mirrors for the purposes of giving durability, are coated with silica solution which has been subjected to a two-step aging process in the presence of basic and acidic catalysts. As a result a coarse surface silica sub-layer having micro-crystal silica particles is formed on the glass substrate. On top of such surface, fluoroalkylsilane (FAS) is applied, forming a water-repellent layer. The water-repellent glass so prepared in accordance with principles of the present invention has excellent water-repellent property and better durability including abrasion-resistance than that prepared using the conventional methods. Its long-term use does not induce deformation in appearance nor deterioration in water-repellent property.

In particular, the process of manufacturing the water-repellent glass in accordance with principles of the present invention proves to be quite effective for providing superior durability to the glass in a simpler and more economic manner than the conventional method. The silica layer, formed by means of the silica solution which has undergone the two-step aging process in the presence of basic and acidic catalysts for the purpose of providing durability, has naturally an ample amount of micro crystal silica particles with the formation of the surface coarseness.

As set forth above, the invention herein relates to water-repellent glass having superior durability and water-repellent property, and the process for manufacturing the same, in which long-term use does not induce deformation in appearance and deterioration in water-repellent property.

What is claimed is:

1. A process for manufacturing a glass article having a water-repellent surface, comprising:

providing a glass substrate having a surface;

preparing a silica solution by subjecting a metal alkoxide-based silane compound to a two-step aging process including a first aging step under one of basic and acidic conditions, and a second aging step under the other of acidic and basic conditions, so that a silica composition is formed which comprises a polymer of granular colloidal silica cross-linked with a linear polymer of siloxane;

applying said silica composition onto said surface of said glass substrate;

subjecting said glass substrate as coated with said silica composition, to a thermal treatment, so as to form said silica composition into a coarse silica layer having fine silica crystal particles distributed throughout; and coating said coarse silica layer with a water-repellent layer.

2. The process of claim 1, wherein:

said aging step under basic conditions is conducted at a pH of more than 9; and said aging step under acidic conditions is conducted at a pH in the range of 1.2 to about 2.7.

3. The process of claim 1, wherein:

said metal alkoxide-based silane compound is combined with at least one inorganic salt selected from the group consisting of NaCl, $NH_4Cl$, $KNO_3$, $NaNO_3$ and $CH_3COONa$.

4. The process of claim 1, wherein:

said thermal treatment is conducted at a temperature in the range of 180 to about 550° C.

5. The process of claim 4, wherein:

said temperature is less than 350° C.

6. The process of claim 1, wherein:

said coarse silica layer has a thickness of from 600 to about 1,000 Å.

7. The process of claim 1 or 5, wherein:

said coarse silica layer has a surface centerline mean coarseness of from 20 about 200 Å.

* * * * *